(12) United States Patent
Watson (10) Patent No.: US 8,096,078 B2
(45) Date of Patent: Jan. 17, 2012

(54) LIVE ANIMAL TRAP

(76) Inventor: Dana Watson, Independence, KS (US)

(*) Notice: Subject to any disclaimer, the term of this patent is extended or adjusted under 35 U.S.C. 154(b) by 271 days.

(21) Appl. No.: 12/267,763

(22) Filed: Nov. 10, 2008

(65) Prior Publication Data

US 2010/0115823 A1     May 13, 2010

(51) Int. Cl.
*A01M 23/18* (2006.01)
(52) U.S. Cl. ............................................. 43/61; 43/74
(58) Field of Classification Search ............. 43/61, 74, 43/76; *A01M 23/18*
See application file for complete search history.

(56) References Cited

U.S. PATENT DOCUMENTS

| | | |
|---|---|---|
| 866,987 A | 9/1907 | Turner |
| 1,453,796 A | 5/1923 | Hovell |
| 1,524,692 A | 2/1925 | Dick |
| 1,747,108 A | 2/1930 | Evans |
| 2,589,002 A | 3/1952 | Vonada |
| 2,692,453 A | 10/1954 | Wingfield |
| 2,737,984 A | 3/1956 | Deane |
| 3,174,250 A | 3/1965 | Gilbert |
| 3,483,652 A | 12/1969 | Hanlan |
| 3,624,951 A | 12/1971 | Gilbaugh |
| 4,162,588 A | 7/1979 | Wyant |
| 4,464,859 A | 8/1984 | Gompers |
| 4,912,872 A | 4/1990 | Wynn et al. |
| 5,778,594 A | 7/1998 | Askins et al. |
| 6,588,139 B2 | 7/2003 | Kao et al. |
| 6,834,460 B1 | 12/2004 | Liu |
| 7,370,451 B2 | 5/2008 | Rich et al. |

FOREIGN PATENT DOCUMENTS

WO    WO 02067674 A1 *  9/2002

* cited by examiner

*Primary Examiner* — Son T Nguyen
*Assistant Examiner* — Shadi Baniani
(74) *Attorney, Agent, or Firm* — Kenneth H. Jack; Davis & Jack, L.L.C.

(57) ABSTRACT

A live animal trap including an enclosure having an open end; a door for covering the forward opening; a hinge for door motions between first and second positions, the door covering the opening in the first position and opening the enclosure in the second position, the door pivoting toward the first position upon enclosure righting and upon inversion counter-pivoting to the second position; a slide shaft; a slide sleeve facilitating slide shaft motions between third and fourth positions, the slide shaft holding the door open while in the third position, the slide shaft releasing the door while in the fourth position, the slide shaft sliding toward the third position upon down tilting the enclosure and sliding toward the fourth position upon up tilting the enclosure; and having an animal contact member attached to the slide shaft's rearward rear end.

16 Claims, 6 Drawing Sheets

LIVE ANIMAL TRAP

FIELD OF THE INVENTION

This invention relates to live animal trapping enclosures. More particularly, this invention relates to assemblies and mechanisms for setting and actuating such trapping enclosures.

BACKGROUND OF THE INVENTION

Conventional and commonly known live animal traps include an enclosure having a single opening and a variably positionable cover or door which operates to open the trap's entry for animal passage, and to close the trap's entry against the animal's escape or exit. Such traps typically include internal trap setting, trap tripping, and animal releasing mechanisms which are difficult and cumbersome for a user or operator to access and manipulate, which are unduly and undesirably mechanically complex, and which are not economically fabricated.

The instant inventive live animal trap solves or ameliorates such problems and deficiencies of such conventional and commonly known live trap assembly animal traps by providing a mechanically simple trap assembly which may be set by an operator for use in trapping animals by manual positioning and turning of the trap in total and without requiring any manipulation by the operator of internal trap setting apparatus, and which may be operated for animal release via similar positioning and turning of the trap.

BRIEF SUMMARY OF THE INVENTION

A first structural component of the instant inventive live animal trap comprises an enclosure which preferably consists of a plurality of walls including an upper wall or ceiling, a lower wall or floor, and paired lateral or left and right walls. Such plurality of walls preferably form and define an interior forwardly opening animal containment space.

A further structural component of the instant inventive live animal trap comprises a door which is preferably fitted for covering the containment space's forward opening. Both the door and the walls of the enclosure preferably comprise a plurality of panel members selected from the group consisting of wire grid sheets, metal bar grid sheets, continuous metal sheets, wood sheets, plastic sheets, and laminate composite sheets such as fiberglass or plyboard. In a preferred embodiment, the door and the enclosure wall panels comprise open grids of wire or metal bars.

A further structural component of the instant inventive live animal trap comprises hinge means which attach and interconnect the door with the greater body of the trap, and which operatively position the door for free swinging pivoting and counter-pivoting motions between first and second positions. While the door occupies its first position, the door preferably covers and closes the containment space's forward opening. Alternatively, upon counter-pivoting of the door to its second position, the door is preferably angularly rearward displaced away from the trap closing first position and toward the enclosure's upper wall. As a result of the door's free swinging pivoting and counter-pivoting capability provided by the hinge means, the door may freely pivot under the force of gravity to the closed first position upon righting the enclosure from an inverted position and remain in such closed position while the trap remains upright. Alternatively, upon inverting the enclosure, the hinge means preferably allows the door to move under the force of gravity in a free swinging counter-pivoting motion toward the second position, which position preferably constitutes an extension of the door along and parallel to the inner surface of the enclosure's upper wall. Preferably, the pivot facilitating juncture between the door and the greater body of the trap is positioned at the upper end of the door and a forward end of the enclosure's upper wall.

A further structural component of the instant inventive live animal trap preferably comprises pivot stopping means which are operatively positioned upon or with respect to the greater body of the trap for, upon coverage by the door of the containment space's forward opening, resisting any forward hyper-extension of the door out of the opening. In a preferred embodiment of the instant invention, the height or vertical dimension of the door is greater than the height or vertical dimension of the containment space's forward opening. Such height differential advantageously serves as the pivot stopping means by causing, upon pivoting motion of the door to its closed first position, the door's lower end to impinge against the enclosure's floor or lower wall rather than further freely pivoting or hyper-extending forwardly beyond the opening. Suitably, other commonly known pivot stopping means such as stop flanges mounted at the containment space's forward opening may be suitably substituted for such height differential pivot stopping means.

A further structural component of the instant inventive live animal trap comprises a preferably rigid bar having front and rear ends. The front end of the bar preferably serves as a door latching and releasing member, and the rear end of the bar preferably serves as an animal contact member support structure.

A further structural component of the instant inventive live animal trap comprises slide means which interconnect the bar and the enclosure, and which operatively position the bar for reciprocating forward and rearward sliding motions between third and fourth positions. Preferably, the slide means comprises a first, and preferably, a pair of slide sleeves which slidably receive the bar which is matchingly configured as a pair of slide shafts. Suitably, other slide means such as bar receiving hooks and bar receiving eye loops may be substituted for such preferred slide sleeves. The slide means is preferably adapted and positioned so that, upon sliding movement of the bar forwardly to its third position, the bar's front end preferably (and assuming complete counter-pivoting of the door to its second position has occurred) engages and holds the lower end of the door. Accordingly, while the bar occupies its forward third position it resists any pivoting motion of the door away from its second position. The slide means further facilitates an opposite rearward sliding motion of the bar from the third position to the fourth position. Upon such sliding motion, the bar's front end (and assuming complete counter-pivoting of the door to its second position has previously occurred) disengages from the door to permit pivoting motion of the door away from the second position and toward its closed first position. In absence of such prior counter-pivoting motion by the door to its second position, such rearward sliding motion of the bar to its fourth position advantageously clears a swing path necessary for the door's completion of such counter-pivoting motion.

Similarly, with the hinge means' adaptation for permitting free swinging gravity driven pivoting and counter-pivoting motions of the door upon inversion, righting or tilting of the enclosure, the slide means is adapted for facilitating the above described reciprocating forward and rearward sliding motions of the bar between the bar's third and fourth positions upon tilting or alternative raising and lowering of the enclosure's forward end. Manual coordination by the operator of such motions allows the operator to set the trap exclusively by positioning of the trap.

The animal contact member which is supported by the rearward end of the bar preferably comprises a plurality of, and preferably a pair of stiff steel wire prongs which are laterally splayed and which extend downwardly into the animal containment space.

In operation of the instant inventive live animal trap, and assuming the provision of preferred structures and components as described above, an operator may preliminarily place animal bait material within the animal containment space at a location slightly rearward from the animal contact prongs. Preferably, the bait is tied or wired in place. Thereafter, the operator may grasp the trap in both hands and may raise or upwardly tilt the trap's forward end. Upon elevating the trap's forward end, the bar guided by the slide means slides rearwardly to its fourth position. Thereafter, the operator may invert the enclosure causing the door to freely counter-pivot to its second position wherein the door co-extends along the undersurface of the enclosure's upper wall. Thereafter, the operator may tilt the forward end of the enclosure downwardly to cause the bar to oppositely slide forwardly from the fourth position to the third position wherein the bar's forward end overlies or overlaps the lower end of the door. Thereafter, the operator may right the enclosure and place the enclosure upon the ground. Upon righting the enclosure, the bar occupying its third position effectively resists pivoting motion of the door away from its second position, the forward end of the bar holding the door in its position extending along the undersurface of the enclosure's upper wall. Thereafter, an animal attracted by the bait may enter the enclosure's forward opening. Upon rearward movement by the animal within the containment space toward the bait, the animal may bodily contact one of the animal contact members which extend downwardly from the rearward end of the bar, such contact drawing the bar rearwardly away from the third position and toward the fourth position. Upon such bar motion, the forward end of the bar releases the lower end of the door, allowing the door to freely pivot away from its second position toward its closed first position, trapping the animal.

The instant inventive live animal trap advantageously allows an operator to set the trap for use by simply moving and angularly positioning the trap rather than requiring the operator to manually access internal trap setting structures and mechanisms. The instant invention further advantageously accomplishes such beneficial trap setting function through the provision of a minimum number of moving parts, promoting cost economies and time savings in the fabrication of the trap.

Accordingly, objects of the instant invention include the provision of a live animal trap which incorporates structures described above and which arranges such structures as disclosed above for the performance of beneficial and advantageous functions described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
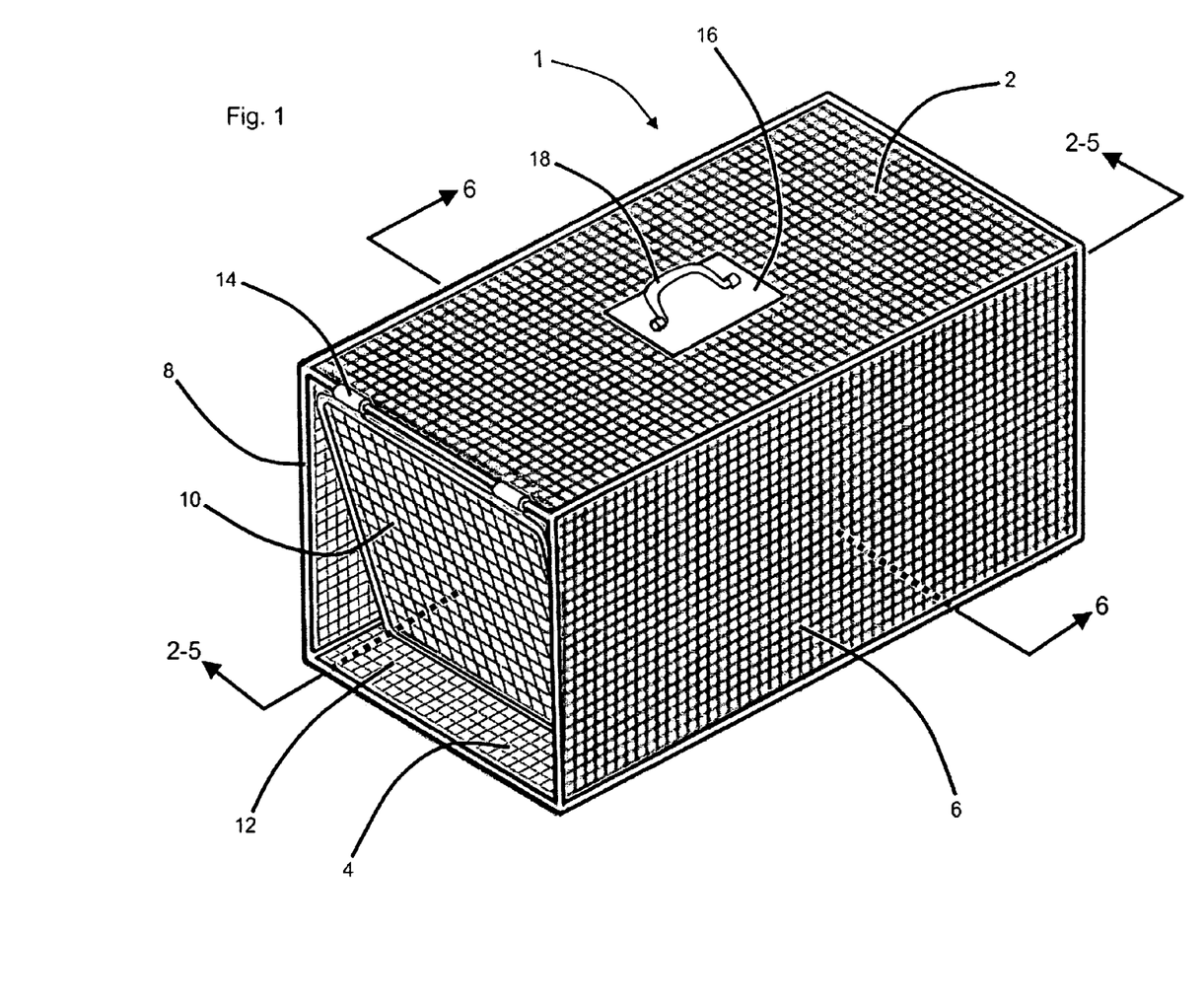
FIG. 1 is an outer perspective view of a preferred embodiment of the instant inventive live animal trap.
Figure 2:
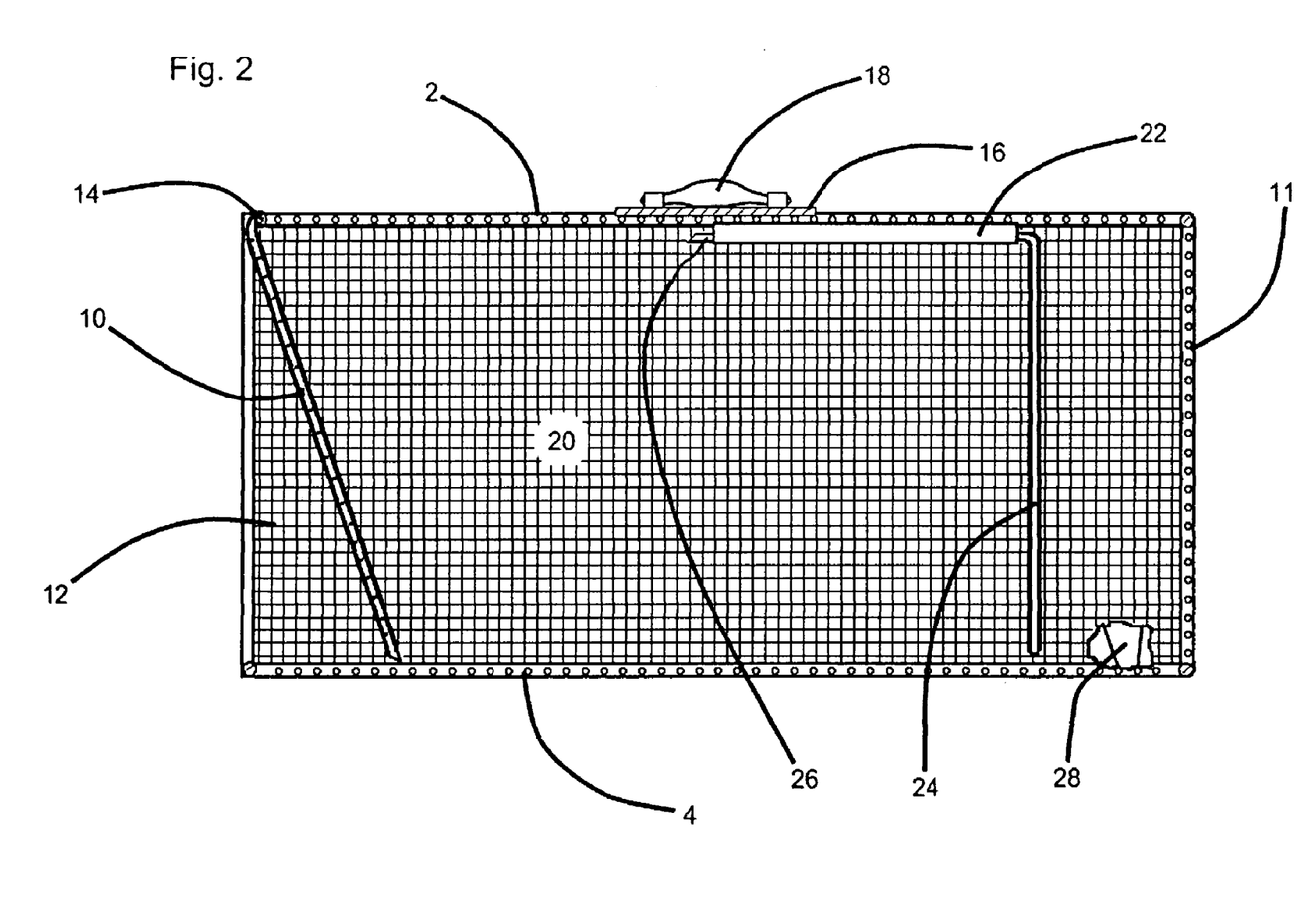
FIG. 2 is a sectional view as indicated in FIG. 1.

Referring now to the drawings and in particular to Drawing FIGS. 1 and 2, a preferred embodiment of the instant inventive live animal trap is referred to generally by Reference Arrow 1.

The live animal trap 1 preferably comprises a plurality of walls including an upper wall or ceiling 2, a lower wall or floor 4, right and left or lateral walls 8 and 6, and a rear or back wall 11. Such walls form and define an interior animal containment space 20 which has a forward opening 12.

Referring further simultaneously to FIGS. 1 and 2, a trap door 10 is preferably provided, the upper end of the trap door 10 preferably being pivotally attached via hinge means 14 to the forward end of the upper wall 2. The door 10 may freely pivot downwardly and forwardly within the animal containment space to its depicted position wherein the door's lower end impinges and stops against the lower wall 4. As is shown in FIGS. 1 and 2, the vertical height of the door 10 exceeds that of the opening 12, such height differential serving as a pivot stopping means which prevent the door 10 from hyper-extending or hyper-pivoting outwardly or forwardly beyond the forward opening 12.

Figure 6:
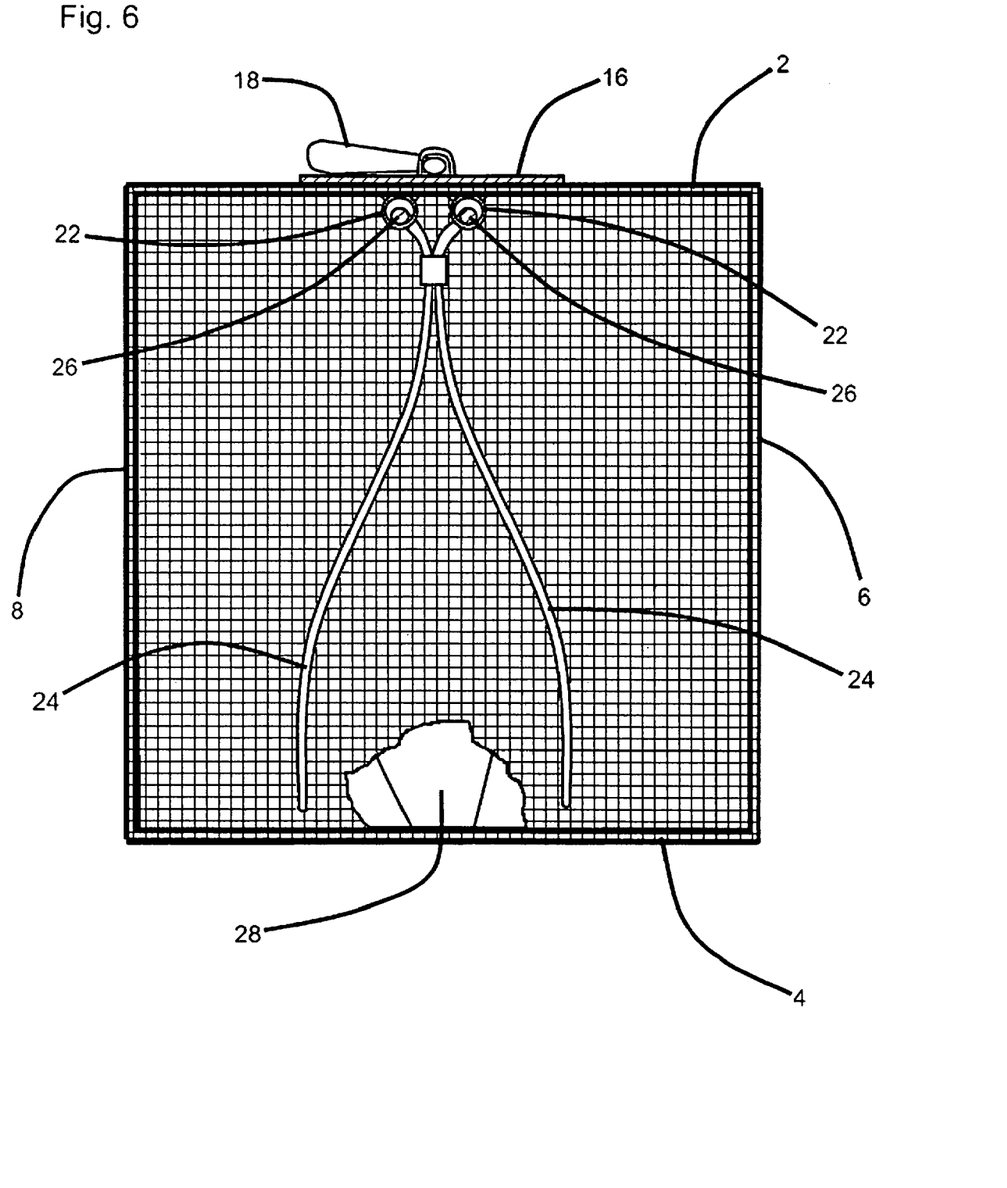
FIG. 6 is an alternative sectional view as indicated in FIG. 1.

Referring simultaneously to FIGS. 2 and 6, a substantially rigid bar is preferably provided, such bar preferably comprising a pair of or left and right slide shafts 26. Slide means are also provided, such means preferably comprising left and right or paired slide sleeves 22. Such slide means preferably position the slide shafts 26 at the undersurface of the upper wall or ceiling 22 and in substantial parallel alignment with the lateral walls 6 and 8. An animal contact member is also provided, such member preferably comprising a plurality of or left and right animal contact prongs 24, such prongs being fixedly attached to or formed wholly with the rearward ends of the slide shafts 26.

In use of the instant inventive live animal trap, referring further simultaneously to FIGS. 2 and 6, an operator may initially place a quantity of animal bait 28 toward the rear of the animal containment space 20. Preferably, the bait 28 is tied in place by wire or cordage upon the lower wall or floor 4. Also preferably, the bait 28 is positioned centrally along the lateral width of the trap, such positioning allowing the bait 28 to pass through a longitudinally extending bait passage space defined between the animal contact prongs 24.

Figure 3:
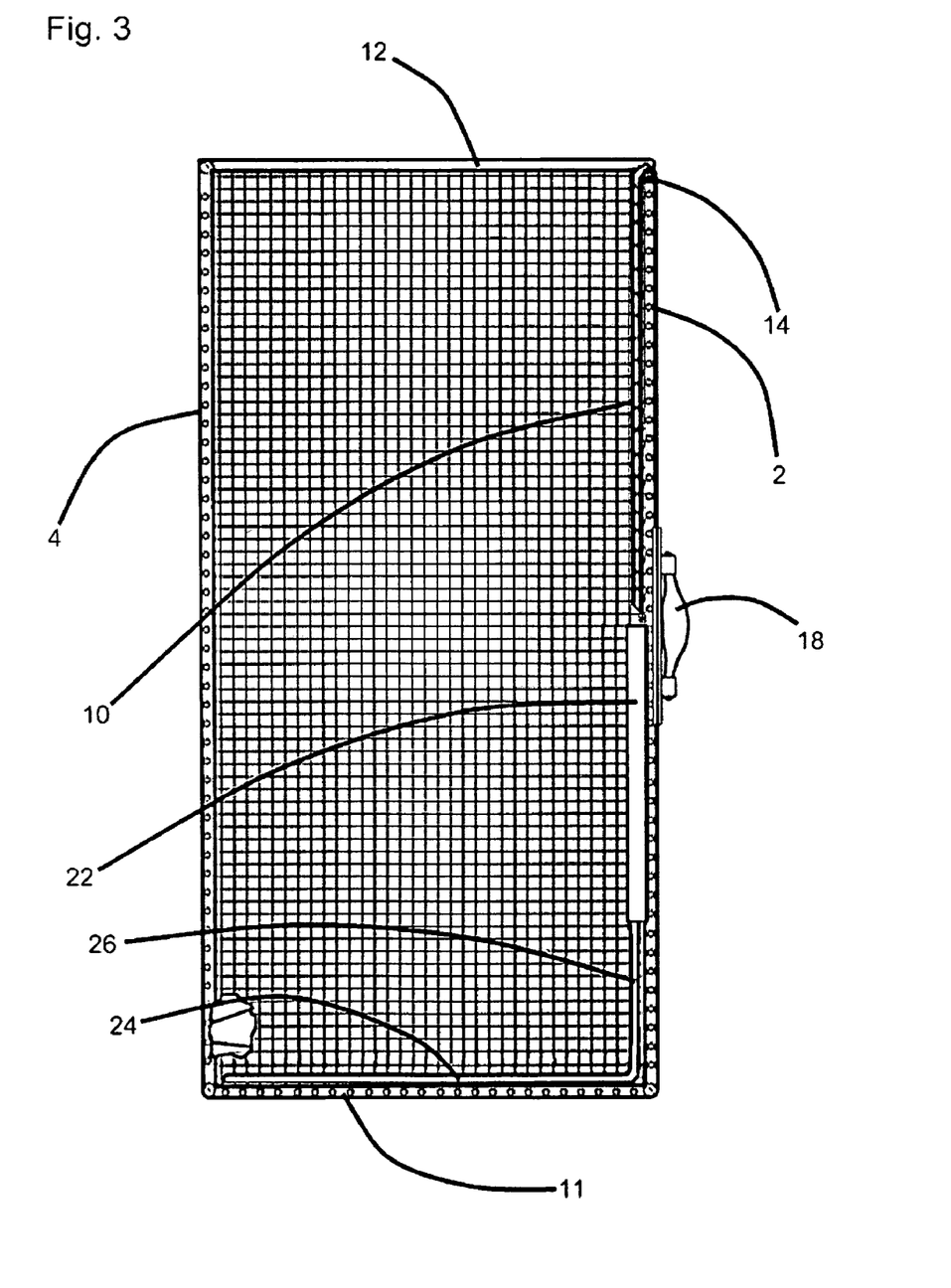
FIG. 3 redepicts FIG. 2, the view of FIG. 3 showing the forward end of the trap tilted upwardly.

Thereafter, referring further simultaneously to FIGS. 2, 3, and 6, the operator may manually tilt the forward end of the animal trap upwardly. Upon reaching a sufficiently upwardly tilted orientation, the slide shafts 26 advantageously slide under the force of gravity rearwardly within the slide sleeves 22 from the forwardly oriented position depicted in FIG. 2 (such position being herein denominated the third position) to the rearwardly displaced position depicted in FIG. 3 (such position being herein denominated the fourth position). Simultaneously, with such upward tilting motion, the door 10 freely swings and counter-pivots under the force of gravity from the downwardly extending trap closing position (herein denominated the first position) depicted in FIG. 2 to the angularly rearwardly displaced position depicted in FIG. 3 (such position being herein denominated the second position). Upon counter-pivoting movement of the door 10 from the closed first position to the opened second position depicted in FIG. 3, the door 10 preferably co-extends with or extends along the inner surface of the upper wall 2.

Figure 4:
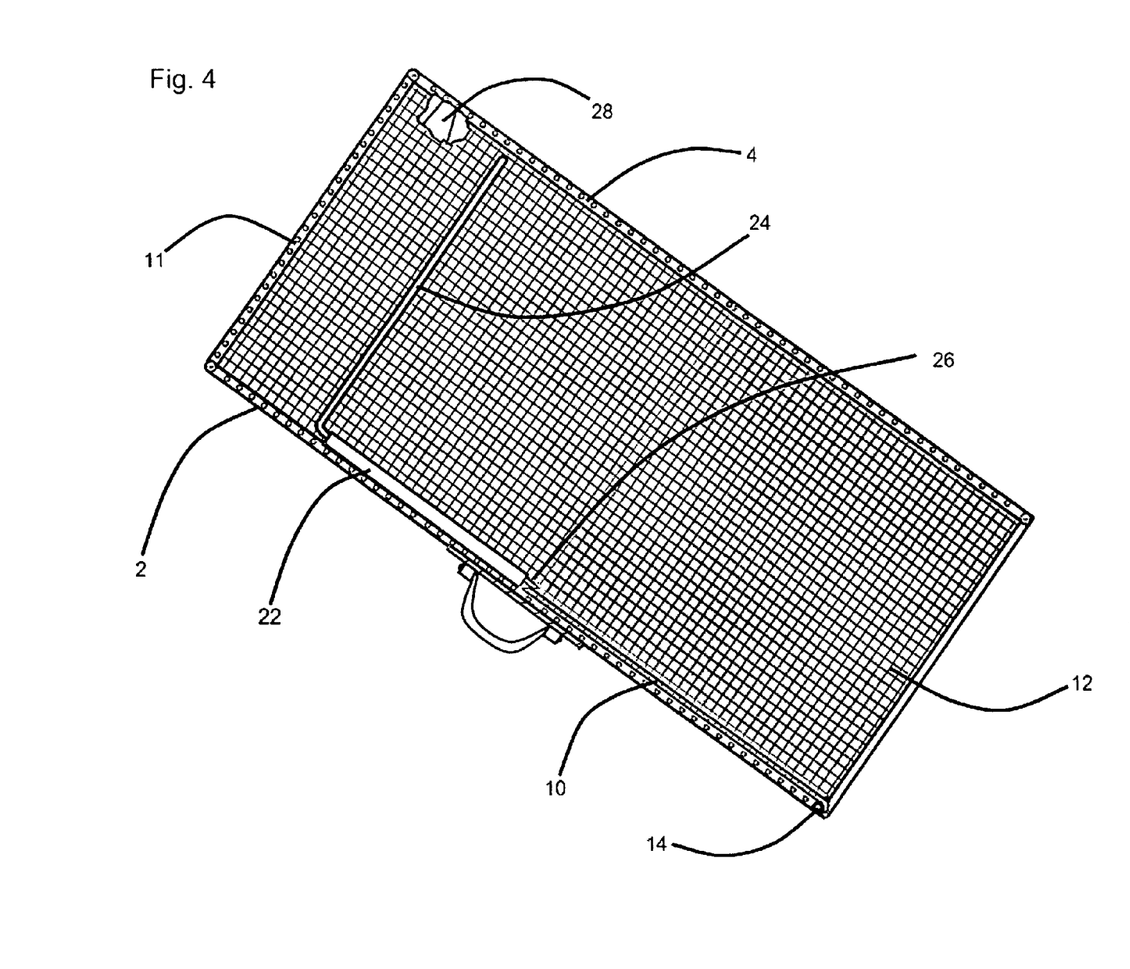
FIG. 4 redepicts FIGS. 2 and 3, the view of FIG. 4 showing the trap inverted and with its forward end tilted upwardly.

Referring further simultaneously to FIGS. 3 and 4, the trap may thereafter be inverted by the operator by further tilting and/or laterally turning the trap from the upwardly tilted position depicted in FIG. 3 to the inverted and downwardly tilted position depicted in FIG. 4. Upon orientation of the trap as depicted in FIG. 4, the door 10 remains in its second counter-pivoted and open position, while the slide shafts 26 forwardly and downwardly slide within their slide sleeves 22 from the fourth position depicted in FIG. 3 to the third position depicted in FIG. 4. Upon slide shaft movements to such third position, their forward ends extend forwardly from the forward openings of the slide sleeves 22, such shaft end protrusions advantageously functioning as door catching and releasing members. As is depicted in FIG. 4, the forward ends of the slide shafts 26 and lower end of the door 10 are preferably matchingly beveled so that the forward ends of the slide shafts 26 will slidably ride over and retain the lower end of the door 10 rather than squarely abutting and obstructing against the door's extreme lower end.

Figure 5:
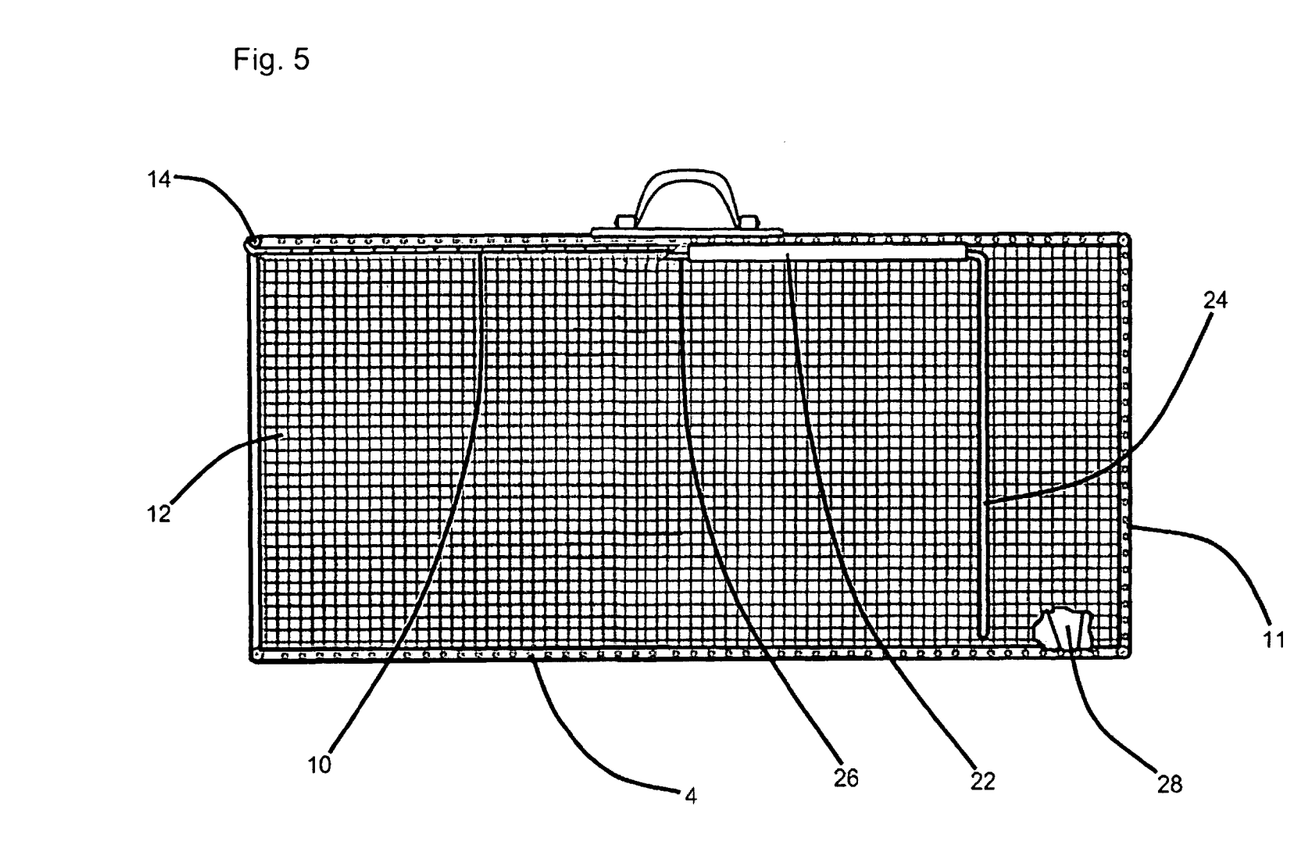
FIG. 5 redepicts FIG. 2, the view of FIG. 5 showing the trap in its set configuration ready for animal trapping.

Referring simultaneously to FIGS. 4, 5 and 6, the operator may thereafter laterally tilt and turn the trap in order to right the trap as is shown in FIG. 5. Upon righting the trap, the protruding forwards ends of the slide shafts 26 continue to engage and hold the door 10 in its counter-pivoted and open second position. While the operator performs such trap righting motions, it is desirable and preferable that the prongs 24 continue to freely extend into the animal containment space without laterally pivoting to impinge against or snag upon one of the lateral walls 6 and 8. Also, upon entry of an animal into the animal containment space, and upon contact by the animal with one of the prongs 24, it is preferred that the animal be unable to laterally pivot and maneuver around the prong without driving the prong rearwardly. In order to restrict such undesirable lateral pivoting motion of the prongs 24, lateral pivot stopping means are preferably provided. Such means preferably comprise the laterally paired configurations of the slide sleeves 22 and the slide shafts 26. Other lateral pivot stopping means, such as incorporation of a single non-circular slide shaft slidably received within a matching non-circular slide sleeve, may be suitably substituted. However, the paired circular slide shafts and sleeves are a preferred lateral pivot stopping means because such configuration promotes longitudinal sliding motion while restricting lateral pivoting motion. As is particularly shown in FIG. 6, the slide shafts 26 are preferably loosely slidably received within the bores of the slide sleeves 22 in order to assure that the slide shafts may freely slide longitudinally therethrough without any binding action between the sleeves and the shafts.

Thereafter, referring to FIGS. 1, 2, and 5, an animal to be trapped (not depicted) such as a stray cat or raccoon may enter the interior of the trap through its forward opening 12, the animal being attracted to the bait 28. Upon reaching for the bait 28, the animal's head, paw, or body may come into contact with one of the prongs 24, pushing the prong rearwardly and causing the slide shafts 26 to move from their third position depicted in FIG. 5 toward their rearwardly oriented fourth positions. Upon such slide shaft motions from the third position to the fourth position, the forward ends of the slide shafts 26 advantageously disengage from the lower end of the door 10, such disengagement allowing the door 10 to freely pivot under the force of gravity from its opened second position to the closed position which is depicted in FIGS. 1 and 2. Upon such closing motion of the door 10, the body of the animal itself prevents the door 10 from being counter-pivoted by the animal toward the open second position. Simultaneously, the floor 4 in conjunction with the excess length of the door 10 functions, as discussed above, as a hyper-pivoting stop, preventing the door from pivoting outwardly and releasing the trapped animal.

Thereafter, referring to FIG. 2, the operator may grasp the trap by its handle 18 in order to pick up the trap and such trapped animal, and to carry them to a suitable release location. While the operator grasps handle 18, a provided scratch shield 16 disposed between the handle 18 and the upper wall or ceiling 2 protects against clawing or biting finger injuries.

One of the primary functions and benefits of the instant invention lies in its capability of being set for animal trapping use solely via manually imposed trap movements and rotations as discussed above, and without requiring an operator to manually access or manipulate any interior trap setting or triggering mechanism. However, the instant invention additionally beneficially performs an animal release function via similar trap movements. In order to release a trapped animal, the trap may be laterally toppled to an inverted orientation upon the ground so that the door 10 counter-pivots under the force of gravity from its closed first position to its opened second position, releasing the trapped animal. Such toppling animal release capability of the instant inventive trap protects the operator from injury by relieving any need to manually work a door release mechanism. Instead of placing fingers in close proximity with the trap to work a release mechanism, the instant inventive trap may be opened for animal release relatively remotely by utilizing a booted foot or pole to topple and invert the trap.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:
1. A trap for live animal capture, the trap comprising:
(a) an enclosure having a horizontally forward end and comprising upper, lower, and lateral walls, and further comprising a horizontally rearward wall, said walls defining a forwardly opening containment space;
(b) a door fitted for covering the containment space's forward opening;
(c) hinge means operatively positioning the door for motions between first and second positions, the door covering the containment space's forward opening while in the first position, the door being angularly displaced rearwardly from the first position while in the second position, the door being pivotable toward the first position upon righting the enclosure, and the door being counter-pivotable toward the second position upon inverting the enclosure;
(d) a bar having front and rear ends;
(f) slide means operatively positioning the bar for reciprocating motions between third and fourth positions, while the bar is in the third position its front end being engageable with the door for resisting pivoting from the second position, while the bar is in the fourth position its front end disengaging from the door for permitting door counter-pivoting or pivoting to or from the second position, said means alternatively horizontally sliding the bar toward the third position upon lowering the enclo- sure's forward end and for sliding the bar horizontally toward the fourth position upon raising the enclosure's forward end; and (g) an animal contact member rigidly attached to the bar's rear end for, upon the bar's reciprocating motions between the third and fourth positions, movement of the animal contact member in unison with the bar's front end, the animal contact member extending into the containment space.

2. The trap of claim 1 further comprising pivot stopping means operatively positioned for, upon pivoting of the door to the first position, resisting door hyper-extension.

3. The trap of claim 2 wherein each wall comprises a panel member selected from the group consisting of wire grid sheets, metal bar grid sheets, metal sheets, wood sheets, plastic sheets, and laminate composite sheets.

4. The trap of claim 3 wherein the door comprises a panel member selected from the group consisting of wire grid sheets, metal bar grid sheets, metal sheets, wood sheets, plastic sheets, and laminate composite sheets.

5. The trap of claim 2 wherein the upper wall has forward end, wherein the door has an upper end, and wherein the hinge means further operatively positions the door's upper end at the upper wall's forward end.

6. The trap of claim 5 wherein, upon counter-pivoting of the door to the second position, the door extends along the upper wall.

7. The trap of claim 2 wherein the door has a height, wherein the containment space's forward opening has a height, and further comprising a height differential wherein the door's height exceeds that of the containment space's forward opening, the pivot stopping means comprising said height differential.

8. The trap of claim 2 wherein the slide means further operatively positions the bar at the upper wall.

9. The trap of claim 8 wherein the lateral walls are arranged substantially parallel with respect to each other, and wherein the slide means further positions the bar substantially parallel with the lateral walls.

10. The trap of claim 9 further comprising lateral pivot stopping means connected operatively to the bar, the lateral pivot stopping means being adapted for, upon laterally tipping the enclosure, resisting lateral movement of the animal contact member.

11. The trap of claim 10 wherein the bar comprises paired slide shafts, wherein the slide means comprises paired slide sleeves receiving the paired slide shafts, and wherein the lateral pivot stopping means comprises the pairing of the slide sleeves and slide shafts.

12. The trap of claim 11 wherein the slide sleeves and slide shafts have substantially circular lateral cross-sectional shapes.

13. The trap of claim 12 wherein the slide shafts are loosely fitted to the slide sleeves.

14. The trap of claim 2 wherein the animal contact member comprises a plurality of downwardly extending prongs.

15. The trap of claim 14 wherein a pair of prongs among the plurality of downwardly extending prongs define therebetween a bait passage space.

16. The trap of claim 2 wherein, upon the inversion of the enclosure and door counter-pivoting to the second position, upon the lowering of the enclosure's forward end and bar sliding to the third position, upon enclosure righting, and upon the animal's entry into the containment space and contact with the animal contact member, the bar may thereby move to the fourth position, releasing the door for animal trapping coverage of the containment space's forward opening.

* * * * *